United States Patent
Halleron et al.

(10) Patent No.: US 10,704,506 B2
(45) Date of Patent: Jul. 7, 2020

(54) METHODS AND SYSTEMS FOR EGR VALVE DIAGNOSTICS

(71) Applicant: Ford Global Technologies, LLC, Dearborn, MI (US)

(72) Inventors: Ian Halleron, Chelmsford (GB); Andres Arevalo, London (GB); Jon Dixon, Maldon (GB); Oliver Gee, London (GB); Sean Harman, Southend on Sea (GB); Zoltan Szilagyi, Budapest (HU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/245,866

(22) Filed: Jan. 11, 2019

(65) Prior Publication Data

US 2019/0226429 A1 Jul. 25, 2019

(30) Foreign Application Priority Data

Jan. 22, 2018 (GB) .................................. 1801027.2

(51) Int. Cl.
| | | |
|---|---|---|
| *F02D 41/22* | (2006.01) | |
| *F02M 26/49* | (2016.01) | |
| *F02M 26/53* | (2016.01) | |
| *F02M 26/48* | (2016.01) | |
| *F02D 41/00* | (2006.01) | |
| *F02D 41/20* | (2006.01) | |

(52) U.S. Cl.
CPC ......... *F02M 26/49* (2016.02); *F02D 41/0077* (2013.01); *F02M 26/48* (2016.02); *F02M 26/53* (2016.02); *F02D 2041/2027* (2013.01)

(58) Field of Classification Search
CPC ........ F02M 26/49; F02M 26/48; F02M 26/53; F02M 26/50; F02M 26/52; F02D 41/0077; F02D 21/08; F02D 2041/2027
USPC .................. 123/568.16; 701/108; 73/114.74
See application file for complete search history.

(56) References Cited

U.S. PATENT DOCUMENTS

| | | | |
|---|---|---|---|
| 4,233,947 A | 11/1980 | Abo | |
| 5,621,167 A | 4/1997 | Fang-Cheng | |
| 6,024,075 A | 2/2000 | Bidner et al. | |
| 6,850,833 B1* | 2/2005 | Wang | F02D 41/0055 123/568.12 |

(Continued)

FOREIGN PATENT DOCUMENTS

| | | |
|---|---|---|
| DE | 102010041119 A1 | 3/2012 |
| EP | 1394400 A1 | 3/2004 |

(Continued)

OTHER PUBLICATIONS

Great Britain Intellectual Property Office, Search Report under Section 17 Issued in Application No. GB1801027.2, dated Jul. 20, 2018, 4 pages.

*Primary Examiner* — Hai H Huynh
(74) *Attorney, Agent, or Firm* — Geoffrey Brumbaugh; McCoy Russell LLP

(57) ABSTRACT

Methods and systems are provided for an EGR valve diagnostic. In one example, a method may include actuating an EGR valve between first and second positions. The method may further includes determining one or more characteristics of the EGR valve during the diagnostic to determine if an EGR valve cleaning is desired.

20 Claims, 7 Drawing Sheets

(56) References Cited

U.S. PATENT DOCUMENTS

| | | | | |
|---|---|---|---|---|
| 8,649,961 B2 * | 2/2014 | Hawkins | ................ | F02M 26/49 |
| | | | | 123/568.16 |
| 2006/0272625 A1 | 12/2006 | Wang | | |
| 2009/0265084 A1 | 10/2009 | Enomoto | | |
| 2019/0375395 A1 * | 12/2019 | Jentz | .................... | B60W 10/06 |

FOREIGN PATENT DOCUMENTS

| | | |
|---|---|---|
| FR | 2677123 A1 | 12/1992 |
| JP | 2008063964 A | 3/2008 |
| KR | 20150115043 A | 10/2015 |
| WO | 2011117108 A1 | 9/2011 |

* cited by examiner

METHODS AND SYSTEMS FOR EGR VALVE DIAGNOSTICS

CROSS REFERENCE TO RELATED APPLICATION

This application claims priority to Great Britain Patent Application No. 1801027.2, filed Jan. 22, 2018. The entire contents of the above-referenced application are hereby incorporated by reference in their entirety for all purposes.

FIELD

The present description relates generally to an exhaust gas recirculation (EGR) valve diagnostic method.

BACKGROUND/SUMMARY

EGR valves may be used in engines to recirculate part of the exhaust gas back into the internal combustion chamber of the engine. This has the benefit of lowering the emissions of the engine and therefore lowering the emissions of the vehicle in which the engine is situated, since the presence of exhaust gas dilutes the oxygen percentage in the incoming air stream with gases inert to combustion which therefore absorb heat. This may have the effect of lowering the engine temperature and therefore reducing the amount of NOx gases generated, since NOx gases are generated when nitrogen and oxygen are subject to high engine temperatures.

As EGR valves recirculate exhaust gas they may be prone to accumulating carbon deposits and other particulates in the exhaust gas that can hamper, or prevent, the valves from opening. Without treatment (e.g. cleaning or other maintenance) this can eventually lead to the EGR valve sticking closed, fully open, or partially open. For example, EGR valves of the poppet design can suffer from contamination of the valve stem which, as above, can lead eventually to the valve sticking closed, fully open, or partially open. Before EGR valves become fully stuck they may exhibit slow movement demanding large control effort and may exhibit jerky "stick-slip" motion. This can result in too much or too little exhaust gas flowing, which can lead to undesirable engine operations including increased engine-out emissions, combustion instability, inefficient engine starting, overheating of engine components, etc.

If this is detected by the diagnostic elements of the engine control system then this may result in a reduction in the engine power, or even the engine being disabled. Consequently, the vehicle may demand a visit to a repair facility, which may include replacement of the EGR valve depending on a magnitude of the contamination.

EGR valve contamination may be caused by, for example, the condensation of hydrocarbons and water and the accumulation of soot onto the EGR valve stem, which may be exacerbated at low temperatures. Increased usage of EGR valves at low temperatures due to more stringent emissions standards may be more likely to increase the risk of the above described type of "cold fouling" and/or "cold contamination" of the EGR valve.

In one example, the issues described above may be addressed by a method for comprising executing an EGR valve diagnostic following an engine deactivation, wherein the EGR valve diagnostic calculates three or more of a breakaway value, a holding power value, a hang time value, a travel time value, and a travel speed value as an EGR valve is actuated from a resting position, to a predetermined position, and back to the resting position. In this way, an estimation of a contamination and/or an accumulation of particles on the EGR valve may be gathered, which may signal an EGR valve cleaning mode to block the EGR valve from becoming too contaminated such that service is requested.

As one example, the breakaway value, holding power value, hang time value, travel time value, and travel speed value are compared to respective thresholds, wherein if one or more of the values is outside of its respective threshold, then the cleaning of the EGR valve may be signaled. The EGR valve diagnostic may function to determine when EGR valve operation has degraded. However, this degradation may be relatively small such that engine operating characteristics are not impacted by the degraded EGR valve operation. As such, the EGR diagnostic may be a preventative diagnostic used to estimate when contamination of the EGR valve is sufficient to demand the cleaning, which may occur in response to a measured characteristic of the EGR valve not meeting a desired value.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
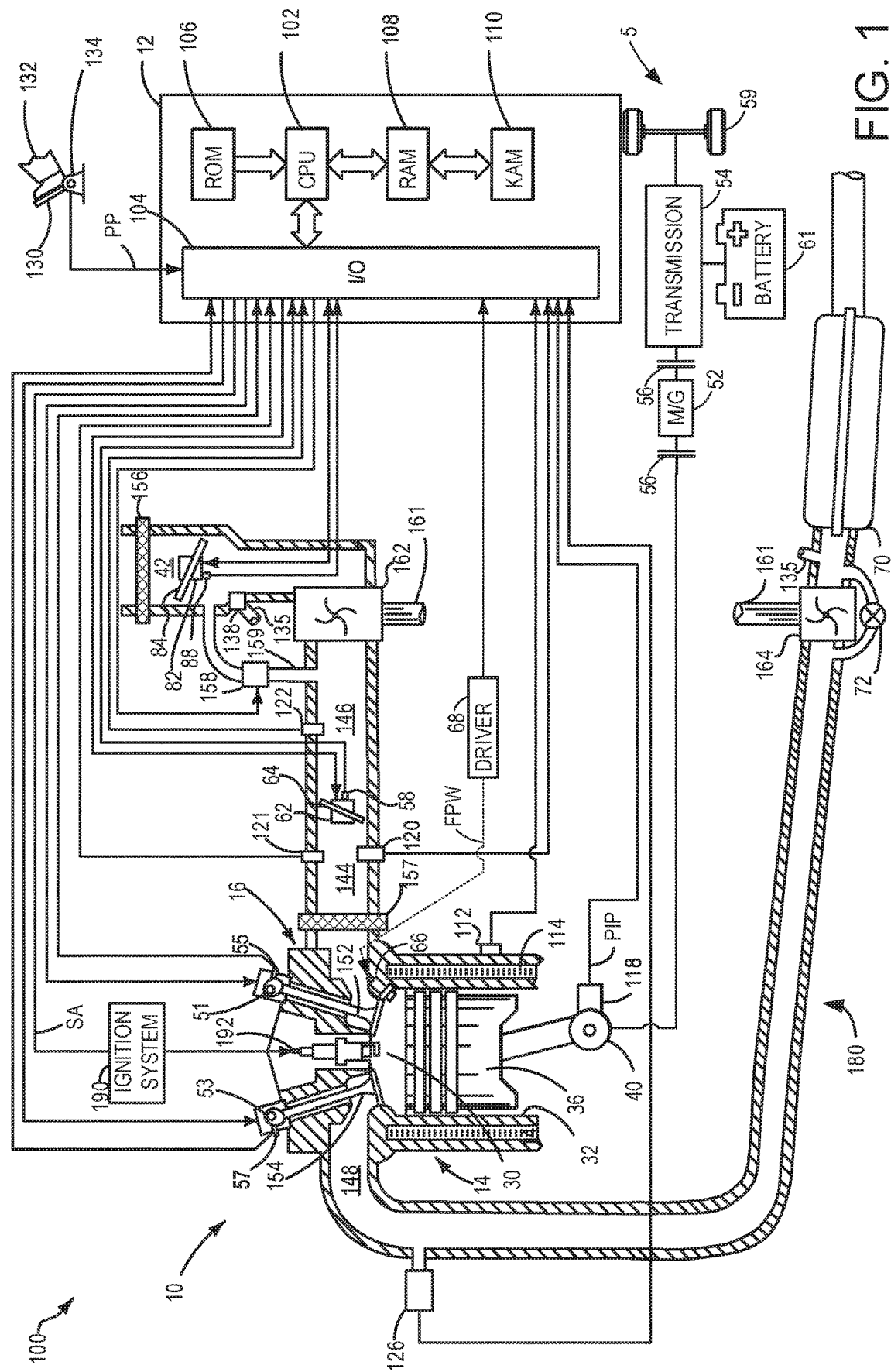
FIG. 1 illustrates a schematic of an engine included in a hybrid vehicle.
Figure 2:
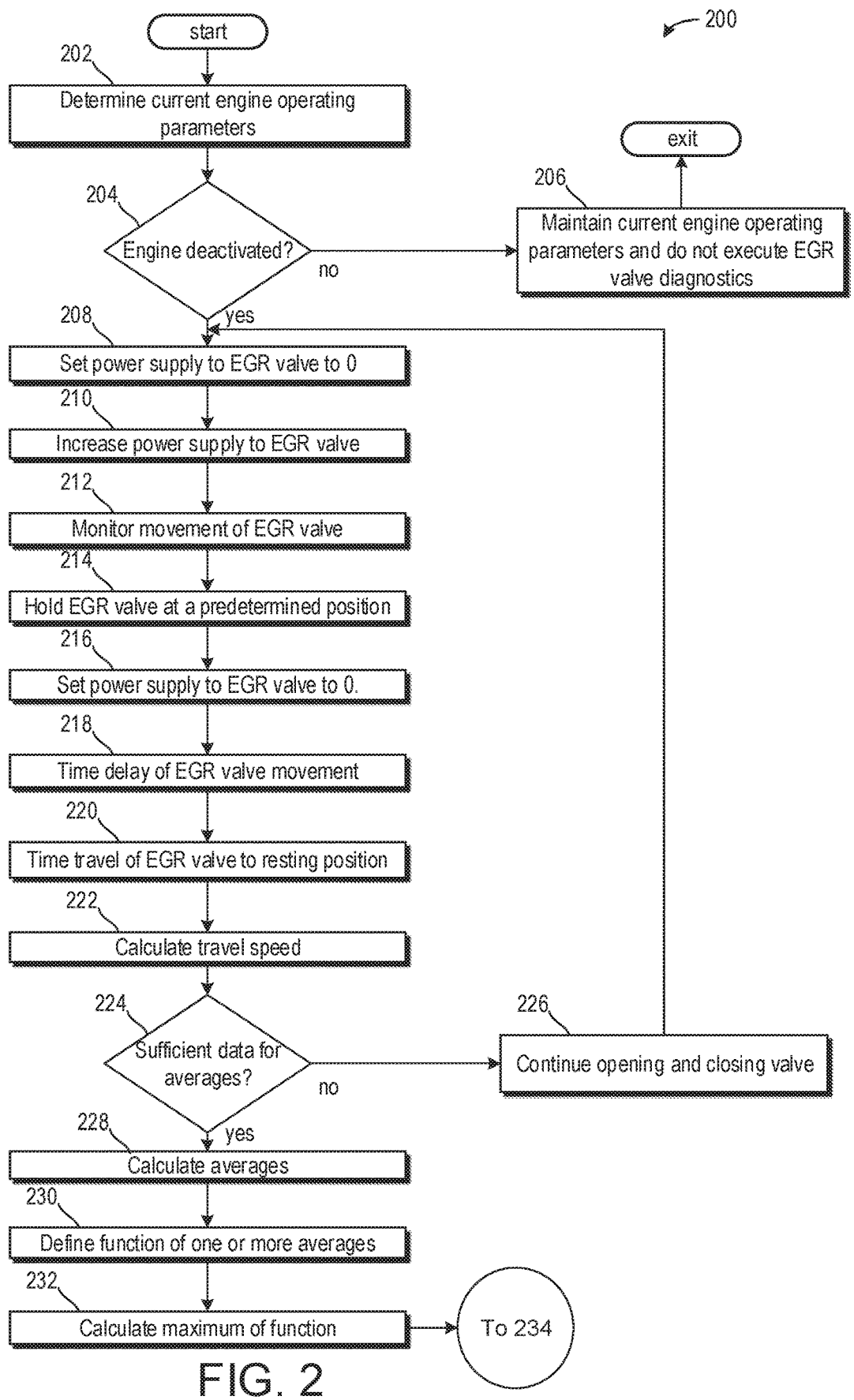
FIG. 2 illustrates an EGR valve diagnostic method.
Figure 2:
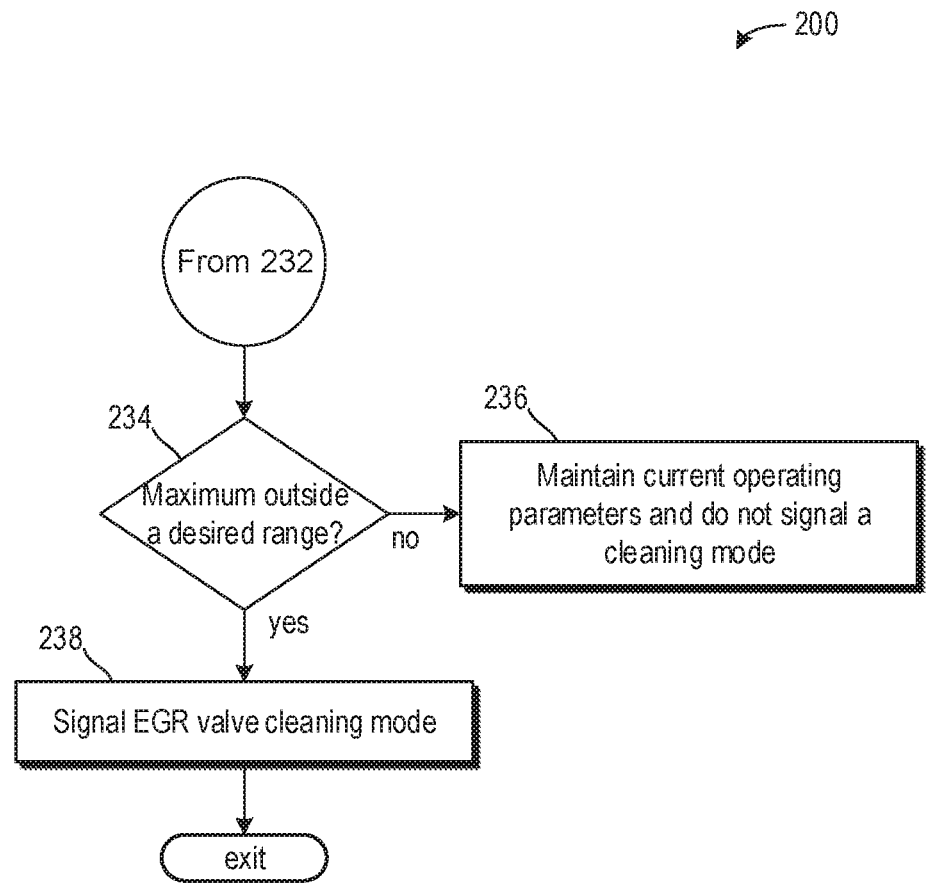
Figure 3:
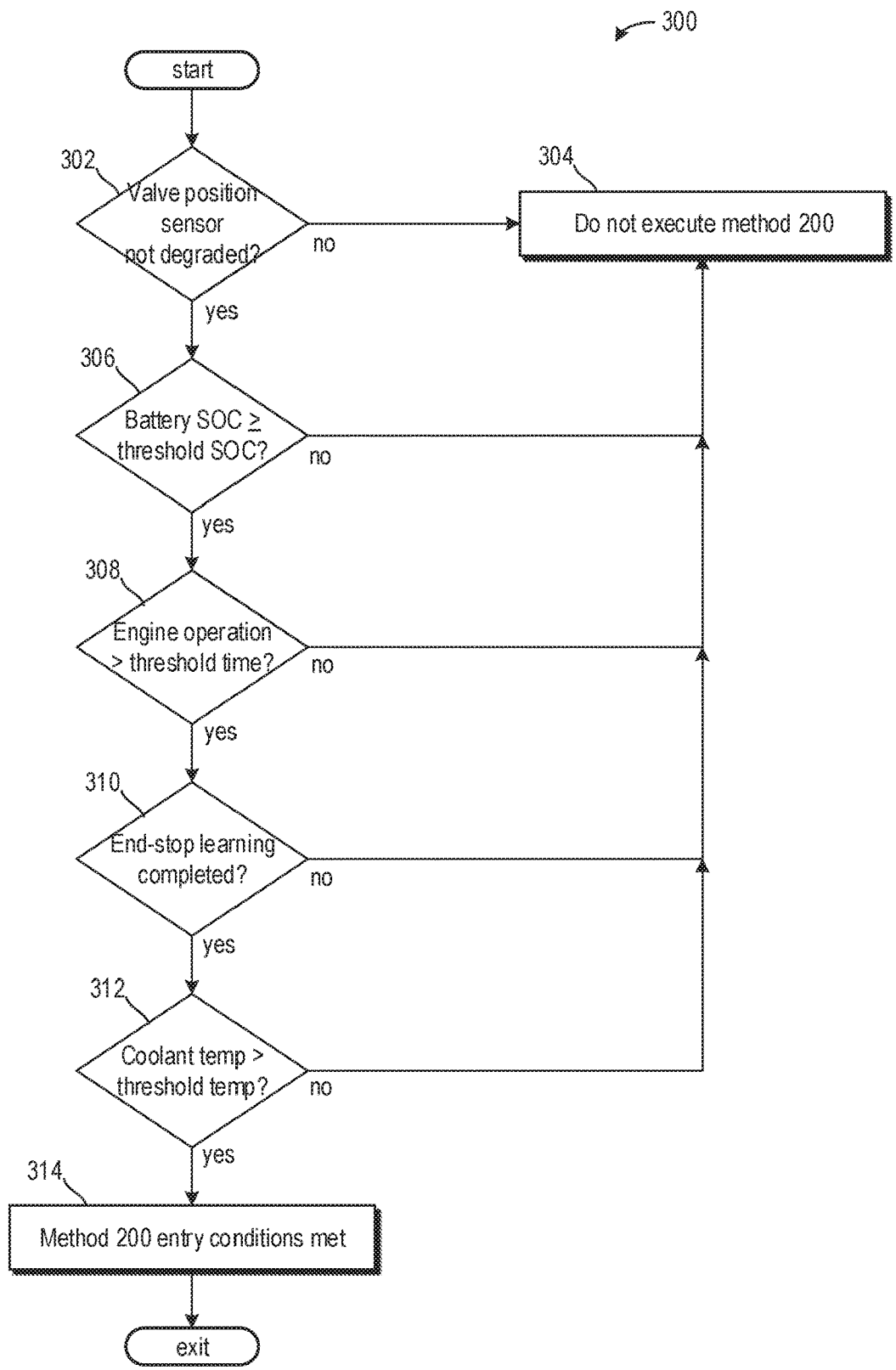
FIG. 3 illustrates a method for determining if one or more entry conditions for the EGR valve diagnostic method are met.
Figure 4:
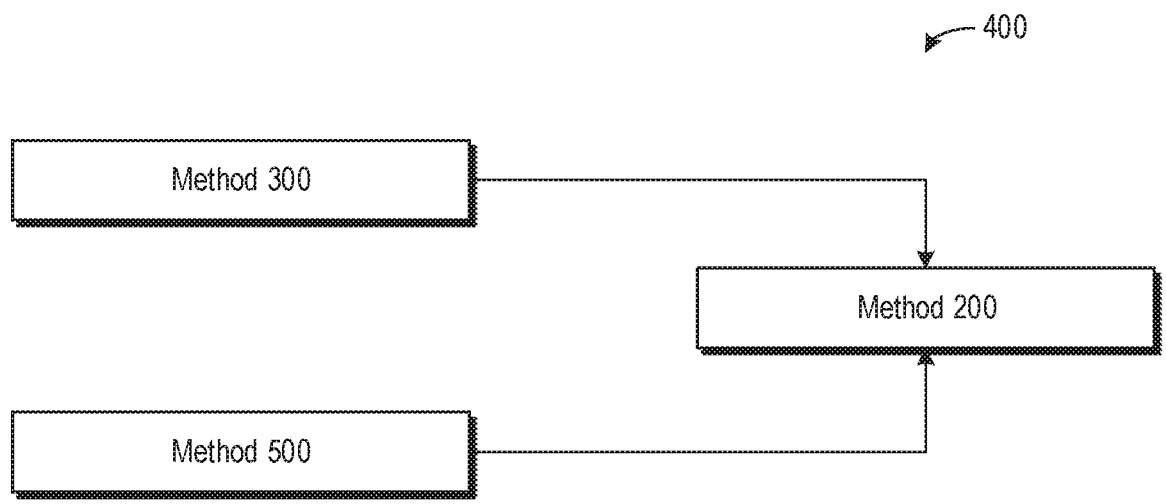
FIG. 4 illustrates a flow diagram illustrating methods executed prior to the EGR valve diagnostic method.
Figure 5:
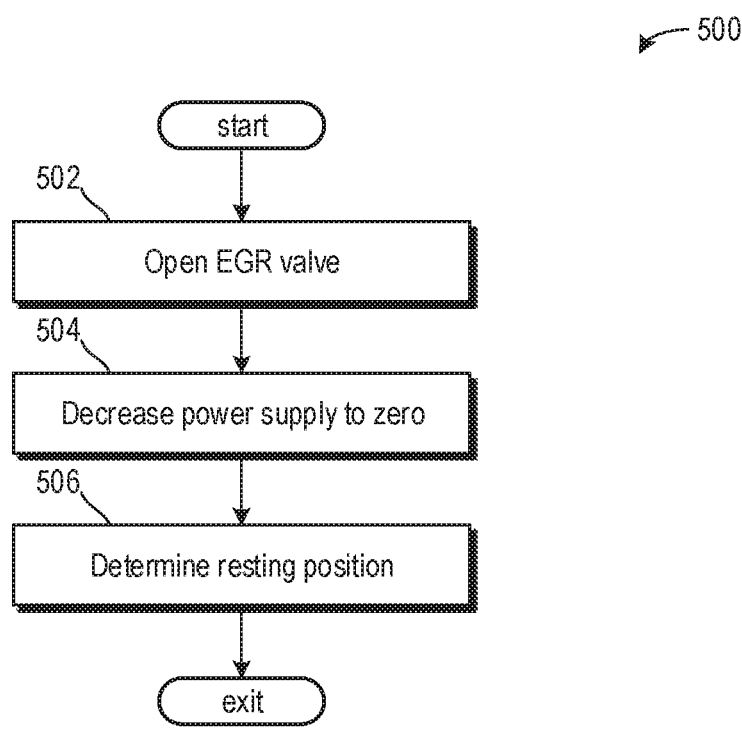
FIG. 5 illustrates a method for learning one or more positions of the EGR valve.
Figure 6A:
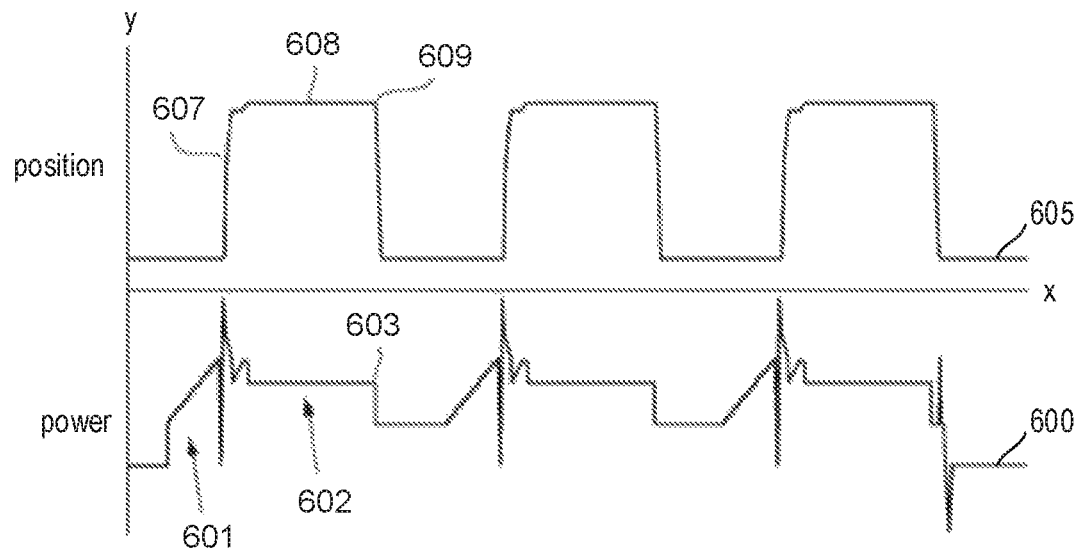
FIG. 6A illustrates a graph showing the power supplied to an EGR valve actuator with the corresponding valve position during three cycles of part of the diagnostic method of FIG. 2.
Figure 6B:
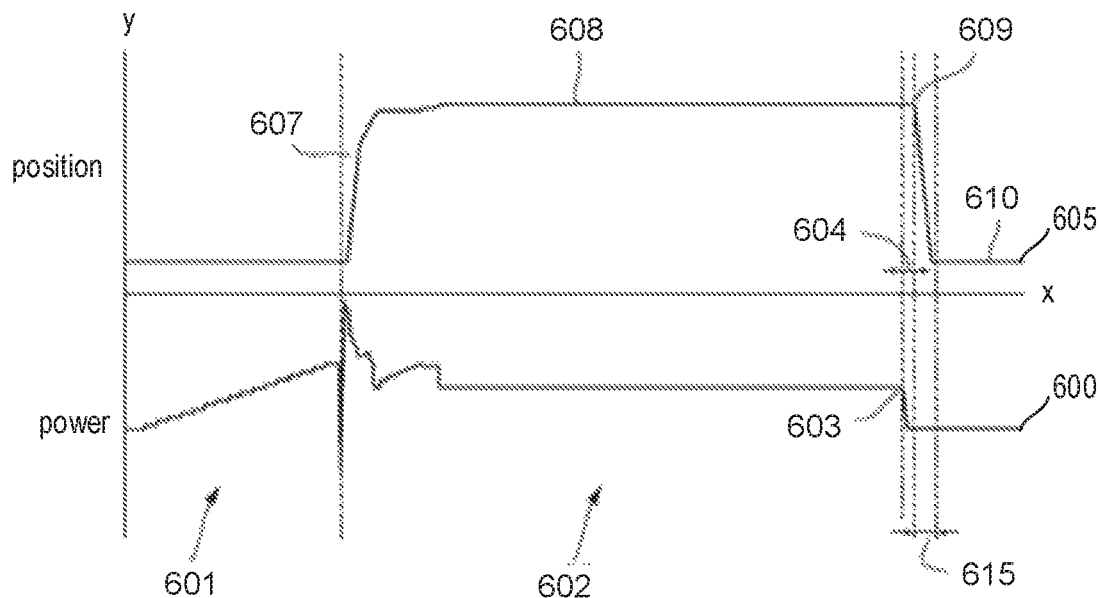
FIG. 6B illustrates a graph showing the power supplied to an EGR valve actuator with the corresponding valve position during a single cycle of part of the diagnostic method of FIG. 1.
Figure 7:
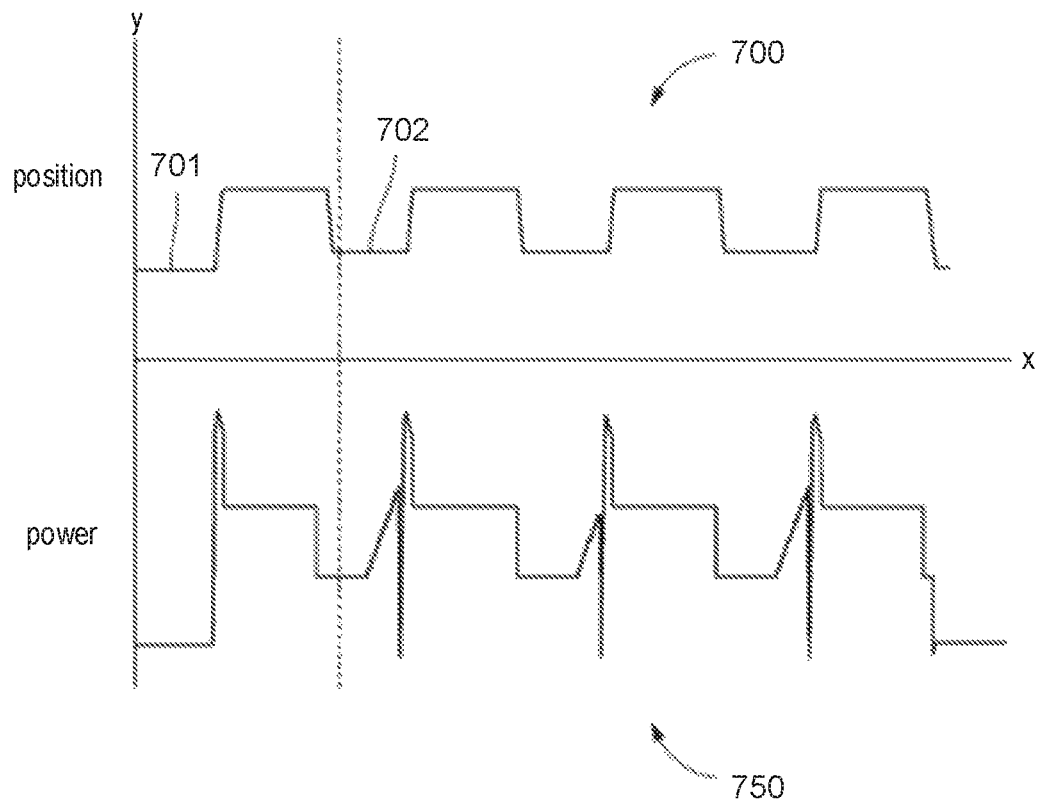
FIG. 7 is a graph showing the power supplied to an EGR valve actuator with the corresponding valve position during a pre-conditioning phase, being the part of the diagnostic method shown in FIG. 4, and three subsequent cycles of the diagnostic method of FIG. 2.

The following description relates to systems and methods for an EGR valve diagnostic. The EGR valve may be an EGR valve for a high-pressure (HP) or low-pressure (LP) EGR. In the example of FIG. 1, the EGR valve is illustrated as a LP-EGR valve arranged in an engine system of a hybrid vehicle. Example methods for executing the EGR valve diagnostic and determining entry conditions thereof are shown in FIGS. 2, 3, and 5. The method may determine premature fouling and/or contamination of the EGR valve. By determining premature fouling, emissions may be reduced and EGR valve integrity may be maintained. FIG. 4 illustrates a flow diagram showing that methods of FIGS. 3 and 5 may be executed prior to the method of FIG. 2 if conditions are satisfied. FIG. 6A illustrates an amount of power supplied to the EGR valve during three cycles of the diagnostic method. FIG. 6B illustrates a detailed view of the amount of power supplied to the EGR valve during a single cycle of the three shown in FIG. 6A. FIG. 7 illustrates the amount of power supplied to the EGR valve during a pre-conditioning phase of the diagnostic method.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The present disclosure provides a diagnostic method to detect early onset of EGR valve contamination or fouling and accordingly to trigger remedial cleaning actions.

According to the present disclosure there is provided an exhaust gas recirculation (EGR) valve diagnostic method, the method comprising setting the power supplied to an EGR valve actuator to zero, increasing the power supplied to the EGR valve actuator, determining the power needed to open the EGR valve, actuating the EGR valve to move the EGR valve to a predetermined open position, setting the power supplied to the EGR valve actuator to zero, and at least one of determining the time between the setting the power supplied to the EGR valve actuator to zero and the start of the EGR valve movement towards the closed position and determining the time taken for the EGR valve to travel to within a set distance from the closed position of the EGR valve.

The time taken for the EGR valve to travel to within a set distance from the closed position of the EGR valve may give an indication of contamination of the valve, which can then be used to trigger a remedial cleaning operation. By monitoring the time taken for the valve to move it can be determined if the valve is contaminated to such a degree that valve movement is impaired. The valve may still be operational, but its operation may be less than a desired threshold, and so this method can diagnose and treat valve contamination before the valve demands to be replaced or service at a service center.

Similarly, if it is determined that at least one of the power supplied to the EGR valve actuator to cause it to open, the power needed to hold the EGR valve in the predetermined open position, the time between the setting the power supplied to the EGR valve actuator to zero and the start of the EGR valve movement towards the closed position, the time taken for the EGR valve to travel to within a set distance from the closed position (as above), and/or the speed of the valve when travelling from its predetermined open position to within the set distance from its closed position, does not fall within a predetermined range then this can indicate partial contamination and a remedial cleaning operation may be triggered.

For example, if one or more of the power supplied to open the EGR valve, the power needed to hold the EGR valve in the predetermined open position, the time between setting the power supplied to the EGR valve actuator to zero and the start of the EGR valve movement towards the closed position, and the time taken for the EGR valve to travel to within a set distance from the closed position is above a predetermined threshold, then a cleaning operation may be triggered. Additionally or alternatively, if the speed of the valve when travelling from its predetermined open position to within the set distance from its closed position is below a predetermined threshold, then a remedial cleaning operation may be triggered.

The diagnostic method may begin with setting the power to the EGR valve actuator to zero which may occur after the engine has stopped and/or been deactivated. The valve may still be warm, but there is no exhaust gas recirculation following the engine deactivating. The method may continue by partially opening the valve by supplying some amount of power to a valve actuator so that the EGR valve may move from a fully closed position to a partially open position. The fully closed position may correspond to a position of the EGR valve where exhaust gas may not flow from an EGR passage to an engine. As such, an EGR flow rate may be substantially equal to zero when the EGR valve is fully closed. The method may further include removing the power to the valve actuator so that the EGR valve returns to the fully closed position or to a more closed position. Calculations may be performed to determine the time the valve remains in the partially open position before falling back to the fully closed or more closed positions and the time the valve takes to move from the partially open position to the fully closed or more closed positions. The partially open position of the method may correspond to an EGR valve position where an EGR flow rate is higher than EGR flow rates in the more closed position and the fully closed position.

The method may further include holding the EGR valve at a set position by adjusting a power supplied to the valve actuator of the EGR valve. Adjusting the power supplied may include an increase in the power supplied to the valve actuator of the EGR valve, a decrease in the power supplied to the valve actuator of the EGR valve, or an adjustment to the power supplied to the valve actuator of the EGR valve so that the valve is held at the set position.

The power used to hold the EGR valve at this position, herein referred to as the "holding power" may be indicative of the condition of the return spring on the valve. The power used to move the EGR valve, herein referred to as the "breakaway power", and the time taken before the EGR valves moves toward its closed position following removal of the holding power, herein referred to as the "hang time", may be indicative of the static friction experienced by the valve at its rest position (e.g., the fully closed position where power may not be supplied to the valve actuator of the EGR valve).

The power supplied to the EGR valve may be a duty cycle or a driving current.

Here, when valve actuator is referred to it is meant as all devices capable of actuating the valve. For example, a motor or solenoid could be used. It is also intended that the terms "driving current", "duty cycle", and "power" are read interchangeably since current and duty cycle are merely types of power than can be applied to the EGR valve actuator.

In some examples, movement of the EGR valve may be detected by determining when a movement of the EGR valve is above a predetermined threshold in a direction of movement of the EGR valve. For example, it will be understood that when the EGR valve is a poppet valve comprising a valve stem, the EGR valve will move substantially along a direction parallel to the valve stem. Movement, may therefore be detected when it is determined that the EGR valve has moved greater than a predetermined threshold amount in the direction desired to open the EGR valve. It will therefore be understood that movement may not be detected if the EGR valve has surpassed the predetermined threshold but in the opposite direction (e.g. the direction used to close the EGR valve, if movement from a closed to an open position is to be detected). Additionally or alternatively, in some examples, movement of the EGR valve in either a more closed direction or a more open direction may be detected. The more closed direction may correspond to a movement of the EGR valve from a more open position to a more closed position. As such, the more open direction may correspond to a movement of the EGR valve from a more closed position to a more open position. The predetermined threshold amount may be a distance or a speed.

The degree to which the valve is opened may be selected so that a force of the return spring will not dominate the dynamics. The force of the return spring may increase as the EGR valve is moved further toward the fully open position due to the return spring elongating and/or compressing based on a return spring configuration. As such, the predetermined open position may be selected based on a position where a power used to open the EGR valve is relatively low and where the return spring may force the valve closed in response to an absence of power supplied to a valve actuator. Accordingly, the predetermined open position of the valve may be a partially open position substantially equal to 30% of the fully open position. That is to say, the predetermined open position may more closely resemble the fully closed position compared to the fully open position. As such, the partially open position of 30% or greater of the fully open position may mitigate an impact of the return spring on the breakaway power, but also provide sufficient travel time of the valve during closing to permit measurements.

In one example, additionally or alternatively, the fully closed position may correspond to a position of the EGR valve when zero power is supplied to the valve actuator of the EGR valve. This may allow the EGR valve to return to its fully closed position. The EGR valve may be timed as it moves from the predetermined partially open position to the fully closed position. As described above, the time elapsed for the EGR valve to move from the predetermined partially open position to the fully closed position or to a more closed position between the predetermined partially open position and the fully closed position is described as a hang time. The greater the hang time, then the greater force a static friction acts against the EGR valve, which may be due to a degraded return spring and/or fouling of the EGR valve. For example, particulates accumulated at the EGR valve may apply a counter force to a force of the return spring, therein delaying movement of the EGR valve to a more closed position.

The diagnostic method may be performed at the end of a drive cycle, for example. Additionally or alternatively, the diagnostic method may be performed after a valve cleaning cycle.

In some examples, entry conditions which may signal for the diagnostic method to be executed may include one or more of a position sensor of the EGR valve is not degraded, a battery voltage and/or a battery state of charge is above a lower threshold SOC so that the diagnostic method may be executed along with other vehicle functions during a subsequent engine start, the previous engine drive cycle prior to the engine deactivation elapsed for more than a predetermined period of time, an end-stop learning cycle for the EGR valve has been completed, the engine coolant temperature is above a threshold temperature. The position sensor may be degraded if an EGR flow rate does not match a position provided by the position sensor when the engine is activated. By monitoring if the previous engine drive cycle is greater than the predetermined period of time, an increased number of diagnostic tests due to short drive cycles may be avoided. In one example, the predetermined period of time may be time or distance based. The end-stop learning cycle may correspond to learning positions of the EGR valve. Lastly, by initiating the diagnostic when the engine coolant temperature is above the threshold temperature, friction due to cool temperatures less than the threshold temperature may be avoided so that continuity between diagnostic tests may be maintained. As such, diagnostic tests may be comparable to one another. If one or more of the above conditions is not met, then the diagnostic method may not be executed.

Additionally, a diagnostic method already underway may be aborted if, for example, a valve position sensor has failed, the battery SOC is less than the threshold SOC, the end positions of the valve are not known, and the coolant temperature is less than the threshold temperature.

In some examples, the diagnostic method may be repeated consecutively during a single engine off event to provide a plurality of EGR valve results, wherein an average for each of the corresponding results may be calculated. For example, two or more values may be gathered for the EGR valve hang time, wherein an average hang time for the EGR valve may be determined.

The method may further comprise calculating at least one of an average value of the power used to cause the EGR valve to open (e.g., the average breakaway power). An average value of the power used to hold the EGR valve at the predetermined open position (e.g., the average holding power). An average value of the times between setting the power supplied to the EGR valve actuator to zero and the start of the EGR valve movement towards the closed position (e.g., an average hang time). An average value of the time for the EGR valve to travel to within a set distance from the closed position of the EGR valve (e.g., an average travel time). An average speed of the EGR valve to travel from the predetermined open position to within a set distance from the closed position of the EGR valve (e.g., an average valve speed).

Herein, the average breakaway power may be referred to as function f1. The average holding power may be referred to as function f2. The average hang time may be referred to as function f3. The average travel time may be referred to as function f4. The average valve speed may be referred to as function f5.

At least one of the functions may be polynomial. For example, at least one of the functions may be linear. The diagnostic method may further comprise determining the maximum value of all of the functions f1, f2, f3, f4, and f5, max (f1, f2, f3, f4, f5), and outputting the valve max (f1, f2, f3, f4, f5). If this maximum value max (f1, f2, f3, f4, f5) is greater than a predetermined threshold, the method may further comprise outputting a determination that the EGR valve demands cleaning, and/or instigating a cleaning operation to clean the EGR valve.

By monitoring the average values of a plurality of quantities, and triggering a cleaning action when only one of the averages is above a predetermined threshold, a cleaning action may be triggered when the effects of the contamination is first detected rather than when they start to interfere past a point where service and/or replacement is desired.

It will be understood that any combination of the previously described averages, functions and maximums are within the scope of the present disclosure. For example, the steps of the diagnostic method may be performed and repeated four times but only the average value of the average speed may be of interest. In that case a single function of the average speed may be calculated and the maximum of that function may be the value outputted.

By way of a further illustrative example, the diagnostic method may be performed and repeated twice and the average holding power and the average valve speed only may be calculated across the three cycles. Then, two functions, one of the average holding power and one of the average valve speed, may be defined. The maximum value of these two functions may then be selected as the output.

The diagnostic method may further comprise setting the power supplied to the EGR valve actuator so as to cause the EGR valve to open to a partially open position, setting the power supplied to the EGR valve actuator to zero so as to cause the EGR valve to fall back to a resting position, and when the EGR valve has fallen back to its resting position, recording the resting position of the EGR valve.

For some valve shapes, the mechanical rest position of the valve (e.g. when no driving current is applied to the valve motor/actuator/solenoid etc.) may not be equal to the fully closed position. Instead, for some valve shapes and/or configurations the valve may rest slightly open (e.g. by 10% of the travel distance between the fully open and fully closed positions). As such, the resting position may not be equal to the fully closed position in some configurations of the EGR valve.

Furthermore, if a valve has been held in the fully closed position, then removing the power (e.g. driving current) may not necessarily return the valve to its partially open mechanical rest position. This may be due to the spring force on the valve being relatively low at this point of its movement range in combination with friction on the valve stem and/or the valve seat increasing due to contamination and/or fouling. It is therefore desirable to run the above described diagnostic method where the EGR valve is returned not to its fully closed position (or not to a position very near its fully closed position) but to a natural resting position of the valve when power provided to the valve actuator is substantially equal to zero. This has the effect of mitigating errors caused if the fully closed position (or a position near it) of the valve is used when it is not appropriate to do so, thereby giving erroneous results.

As such, the purpose of a method to determine the mechanical resting position of the valve prior to the diagnostic method may be desired.

It may be determined that the EGR valve has reached its resting position when valve movement has ceased. The resting position may be determined when the speed of the EGR valve is equal to a predetermined speed. It may be determined that the EGR valve has reached its resting position when a fixed time has elapsed following setting the power supplied to the EGR valve actuator to zero. The fixed time may be, for example, 2 seconds. The predetermined speed may be zero.

The EGR valve resting position may be determined prior to the EGR valve diagnostic occurring. In some examples, this may occur during a single engine off event or over multiple engine off events. The set distance may be such that the EGR valve travels to the resting positon and is saved in memory of a controller. As described above, this allows the resting position of the valve to be used in the diagnostic method.

The diagnostic method may be performed if it is determined that the EGR valve resting position is between 5% and 15% of the maximum travel distance of the valve. The diagnostic method may be aborted if it is determined that the EGR valve resting position lies outside of the range of between 5% and 15% of the maximum travel distance of the valve. The range 5% to 15% may be an expected range of positions of the valve in use (e.g. it may be expected that the resting position of the valve will lie within this range). Additionally or alternatively, the resting position may correspond to the fully closed position. Herein, the fully closed position may correspond to a 0% position of the maximum travel distance of the EGR valve and a fully open position may correspond to a 100% position of the maximum travel distance of the EGR valve. As such, a 5% position may be closer to the fully closed position than to the fully open position.

Thus, determining the resting position may be referred to herein as a preconditioning phase. The additional valve movement comprises opening the valve to a partially open position, reducing the power so that the valve falls back to its resting position, which may be distinct from the valve closed position. Once the valve movement has ceased, this valve position is recorded as its resting position. The resting position is used in the diagnostic method to represent the end of valve travel. In some examples, the diagnostic method may not be executed if the resting position corresponds to the fully closed position. If the resting position is equal to the fully closed position, then accumulation of particulates and other EGR compounds may be too low to affect EGR valve operation. In this way, the resting position being equal to the fully closed position may be indicative of the EGR valve operating as desired.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning now to FIG. 2, it shows an EGR valve diagnostic method 200. The diagnostic method may estimate a contamination of an EGR valve, such as EGR valve 138 of FIG. 1. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes determining one or more current engine operating parameters. Current engine operating parameters may include but are not limited to engine speed, throttle position, vehicle speed, and air/fuel ratio.

The method 200 proceeds to 204, which may include determining if the engine is deactivated. In some examples, this may include further determining if the vehicle is stationary. If the engine is not deactivated, then the engine may be active and combusting and the method 200 proceeds to 206, which may include maintaining current engine operating parameters and the EGR valve diagnostic routine is not executed.

If the engine is deactivated, then the method 200 proceeds to 208, which may include setting the power supplied to an EGR valve actuator is set to zero. If the engine is deactivated, this may already occur. However, by allowing the engine to be deactivated before initiating the EGR valve diagnostic routine, exhaust gas may not travel through the EGR valve, which may affect results, and coolant may still be warm, as will be described below. When the EGR valve actuator power supplied is set to zero, the EGR valve may move to a resting position.

The method 200 proceeds to 210, which may include increasing the power supplied to the EGR valve actuator to a value greater than zero. In one example, the power supplied may be at a set rate of increase.

The method 200 proceeds to 212, which may include measuring movement of the EGR valve. This is referred to as the break-away duty cycle $DC_{break}$. $DC_{break}$ is therefore the duty cycle (the power) used to cause the EGR valve to open.

The method 200 proceeds to 214, which may include holding the EGR valve at a predetermined position. The predetermined position may correspond to a position outside of the resting position. The valve duty cycle is adjusted or set to hold the EGR valve steady at a set position, $POS_{hold}$ for a set period of time. This may involve a further increase of the duty cycle to hold the valve steady at $POS_{hold}$, or a decrease of the duty cycle, or merely an adjustment of the duty cycle based on the power supplied at 212. $POS_{hold}$ may be selected such that the force of the return spring of the valve will not dominate the dynamics but should also provide sufficient valve travel time during closing to permit measurements. For example $POS_{hold}$ can be selected to be 30% of the valve opening, meaning 30% of the travel distance between the fully open and closed positions. Said another way, the EGR valve may be moved to a position 30% between the fully closed and fully open positions, wherein the position is nearer to the fully closed position than to the fully open position. The duty cycle used to hold the EGR valve steady at $POS_{hold}$ is referred to as the holding duty cycle $DC_{hold}$. It will be appreciated that the force of the return spring may increase as the EGR valve is moved closer to its fully open position, resulting in a greater impact of the return spring on the dynamics and/or movement of the EGR valve. As such, the predetermined position may be selected based on a position where the return spring may apply less force, wherein the force applied is sufficient for measuring a movement of the EGR valve to the resting position.

In some examples, the EGR valve is maintained at the predetermined position for a threshold amount of time. The threshold amount of time may be less than five seconds. In some examples, the threshold amount of time is two seconds or less.

The method 200 proceeds to 216, which may include setting the power supply to the EGR valve to zero. As such, the EGR valve may begin to move to a resting position, away from the predetermined position.

The method 200 proceeds to 218, which may include timing a delay of the EGR valve moving from the predetermined position to the resting position once the power supply is set to zero. This is referred to as the hang time $t_{hang}$. $t_{hang}$ is therefore the amount of time that the EGR valve "hangs" or "sticks" in the predetermined position in which it was held at 214 ($POS_{hold}$) before falling back to its closed position. $t_{hang}$ may increase as contamination of the EGR valve increases, as will be described below.

The method 200 proceeds to 220, which may include timing a travel of the EGR valve to the resting position. Said another way, the time taken for the valve to travel to within a set distance of the closed position, $POS_{closed}$, is measured. This is the travel time $t_{travel}$. Thus, $t_{travel}$ is the time taken for the EGR valve to travel from $POS_{hold}$ to $POS_{closed}$+x, where x is a set distance. In one possible arrangement, the set distance may be zero.

The method 200 proceeds to 222, which may include calculating a valve travel speed as it moves from the predetermined position at which it was held to the resting position. Said another way, the valve's speed of travel when falling from $POS_{hold}$ to within the set distance from its closed position is calculated, $v_{travel}$. This may be calculated as follows. The distance travelled by the EGR valve, when falling from $POS_{hold}$ to within the set distance of the closed position, is calculated. That distance, $L_{travel}$, is calculated by formula 1 below:

$$L_{travel} = POS_{hold} - POS_{closed}.$$

In other words, the distance travelled by the valve is the distance from its held set position to its closed position. In the formula 1, $POS_{closed}$ is intended not only to refer to the fully closed position of the valve but also to a resting position which may be a set distance from the closed position. If the set distance is zero, then the two values are the same. Accordingly, in the above equation $POS_{closed}$ may be, or may be replaced with, $POS_{closed}$+x. The valve's speed of travel when falling from $POS_{hold}$ to within the set distance from its closed position, $v_{travel}$, is therefore calculated by formula 2 below:

$$v_{travel} = \frac{L_{travel}}{t_{travel}}.$$

The method 200 proceeds to 224, to determine if sufficient data has been gathered to determine averages. In one example, sufficient data may include comprising at least two or more values for each of the breakaway values, holding values, hang time values, travel time values, and travel speed values. If sufficient data is not gathered, then the method 200 may proceed to 226 to continue opening and closing the EGR valve. This may include repeating 208 through 222 multiple times within a single engine off event or over multiple engine off events.

If sufficient data has been gathered, then the method 200 proceeds to 228 to calculate averages for each of the breakaway duty cycle, holding duty cycle, hang time duty cycle, travel time duty cycle, and travel speed duty cycle of the EGR valve. The breakaway duty cycle may be referred to as $DC_{break}$, the holding duty cycle may be referred to as $DC_{hold}$, the hang time duty cycle may be referred to as $t_{hang}$, the travel time duty cycle may be referred to as $t_{travel}$, and the travel speed duty cycle may be referred to as $v_{travel}$.

The averages of the breakaway duty cycles, the averages of the holding duty cycles, the average value of the hang times, and the average value of the travel times, and valve speeds are calculated. These average values will be denoted as $\overline{DC}_{break}$, $\overline{DC}_{hold}$, $\overline{t}_{hang}$, $\overline{t}_{travel}$, and $\overline{v}_{travel}$, respectively. $\overline{DC}_{break}$, $\overline{DC}_{hold}$, $\overline{t}_{hang}$, $\overline{t}_{travel}$, and $\overline{v}_{travel}$ are therefore calculated over the number of repetitions of steps 208-222. For example, if steps 208-222 have been repeated 3 times, there will be four values of each of $DC_{break}$, $DC_{hold}$, $t_{hang}$, $t_{travel}$, and $v_{travel}$ and each of the four values for each quantity will be averaged.

The method 200 proceeds to 230, which may include defining a function of one or more of the $\overline{DC}_{break}$, $\overline{DC}_{hold}$, $\bar{t}_{hang}$, $\bar{t}_{travel}$, and $\bar{v}_{travel}$. Each function may be referred to as a valve stickiness factor. In one example, a function for each average is determined such that $f_1$, $f_2$, $f_3$, $f_4$, $f_5$, respectively correspond to $\overline{DC}_{break}$, $\overline{DC}_{hold}$, $\bar{t}_{hang}$, $\bar{t}_{travel}$, and $v_{travel}$. Thus $f_1$ is the breakaway duty cycle stickiness factor and is a function of the average breakaway duty cycle, $f_1=f_1(\overline{DC}_{break})$. $f_2$ is the holding duty cycle stickiness factor and is a function of the average holding duty cycle, i.e. $f_2=f_2(\overline{DC}_{hold})$. $f_3$ is the hang time stickiness factor and is a function of the average hang time, i.e. $f_3=f_3(\bar{t}_{hang})$. $f_4$ is the travel time stickiness factor and is a function of the average travel time, i.e. $f_4=f_4(\bar{t}_{travel})$. $f_5$ is the valve speed stickiness factor and is a function of the average valve speed, i.e. $f_5=f_5(\bar{v}_{travel})$.

The functions $f_1$, $f_2$, $f_3$, $f_4$, $f_5$ may be polynomial functions (e.g. linear functions). Alternatively they may represent the output of an individual look-up table using their inputs (e.g. $\overline{DC}_{break}$) as the input to the look-up table, the output being the corresponding valve stickiness factor to the input. $f_4$ may, for example, be the output of a look-up table having $\bar{t}_{travel}$ as its input. The functions may also be calibrated or tuned to provide different weighting to each of the test results. The functions allow a relationship between the measured parameter (e.g. valve speed) and the stickiness factor output. This relationship may be linear.

The method 200 may proceed to 232, which may include calculating the maximum for the at least one function. In one example, the method 200 may include determining a maximum for each of the functions $f_1$, $f_2$, $f_3$, $f_4$, and $f_5$. The maximum of these individual stickiness factors is selected as the output of the diagnostic method 200, i.e. $\max(f_1, f_2, f_3, f_4, f_5)$. The maximum values may provide a qualitative indication of the contamination of the EGR valve.

The method 200 proceeds to 234 to determine if a maximum value is outside a desired range. In one example, each maximum value of the various functions may be compared to a different desired range and/or corresponding threshold. For example, a maximum of $f_1$ may be compared to a threshold break value. Further, a maximum of $f_2$ may be compared to a threshold hold value. A maximum of $f_3$ may be compared to a threshold hang value. A maximum of $f_4$ may be compared to a threshold travel time value. A maximum of $f_5$ may be compared to a threshold travel speed value. For each of the maximum values of $f_1$, $f_2$, $f_3$, and $f_4$, if the maximum value is less than its corresponding threshold, then the method 200 proceeds to 236 to maintain current operating parameters and does not signal a cleaning mode. Similarly, if the maximum value of $f_5$ is greater than the threshold travel speed (e.g., the valve is travelling at a desired speed), then the method 200 proceeds from 200 to 236.

However, if one or more of the maximum values of $f_1$, $f_2$, $f_3$, and $f_4$ exceeds its corresponding threshold or if the maximum value of $f_5$ is less than the threshold travel speed, then the method 200 may proceed to 238 to signal an EGR valve cleaning mode. The EGR valve cleaning mode may be executed during a future engine operating condition when conditions are met. In one example, the EGR valve cleaning mode may be executed during a subsequent engine start.

Said another way, as five quantities representative of the valve stickiness (i.e. how much the valve may be contaminated) are monitored, but cleaning action is triggered based on one of them (i.e. the highest stickiness factor), an estimation is formed of how contaminated the EGR valve may be even though it may still be fully operational. Accordingly cleaning actions may be triggered when the effects of contamination are first detected rather than when they start to interfere with the control of the EGR.

Although "driving duty cycle" has been exemplified in the steps of method 200 this is merely one example of providing power to the EGR valve/EGR valve actuator. All suitable power sources can be used instead, or in addition, to driving duty cycle. Accordingly, driving current may be used instead of the duty cycle and therefore terminology such as $\overline{DC}_{break}$, being the average breakaway duty cycle, would be $\bar{I}_{break}$, being the average breakaway current etc. Such changes will be apparent to the skilled person if current were used in the steps of method 200 instead of the duty cycle.

According to method 200, movement of the EGR valve may be detected to accurately determine a contamination of the EGR valve. Detection of the valve movement (e.g. from the closed or from the held position) may be achieved by detecting a movement of the valve of more than a set size in the appropriate direction.

Turning now to FIG. 3, it shows a method 300 for determining if an EGR valve position may be determined. It will be appreciated that method 300 may be executed prior to execution of method 200 of FIG. 2. In some examples, method 300 may be executed while an engine is active.

The method 300 begins at 302, which includes determining if an EGR valve position sensor is not degraded. As described above, this may include determining if the EGR valve position sensor is providing feedback to a controller (e.g., controller 12 of FIG. 1). Additionally, or alternatively, this may further include cross-checking current EGR flow rates with feedback from the EGR valve position sensor. If a degradation is present, then the method 300 proceeds to 304 which includes not executing the method 200.

If no degradations are present and the EGR valve position sensor is operating as desired, then the method 300 proceeds to 306, which includes determining if a battery SOC is greater than or equal to a threshold SOC. The threshold SOC may be based on a battery SOC sufficient to execute the method 200 along with engine start-up operations upon a subsequent engine start. If it is determined that the battery SOC is less than the threshold SOC, then the method 300 proceeds to step 304 as described above.

If the battery voltage is greater than or equal to the threshold SOC, then the method 300 proceeds to 308 which includes determining if an engine operation prior to the EGR valve diagnostic method ran for more than a threshold duration of time. The threshold duration of time may be based on an amount of time so that repeated testing for brief engine cycles is avoided. If it is determined that the engine has not run for more than the threshold duration of time, then the method 300 proceeds to 304, as described above.

If the engine has run for more than the threshold duration of time, then the method 300 proceeds to 310 which includes determining if the end-stop learning cycle for the EGR valve has been previously completed. The end-stop learning cycle may comprise learning the end positions of the valve travel, which may at least comprise learning the resting position of the EGR valve. If the valve travel positions are not known, the method 300 proceeds to 304 as described above.

If the end-stop learning cycle has been completed, then the method 300 proceeds to 312 which includes determining if an engine coolant temperature is greater than a threshold temperature. The threshold temperature may be based on a coolant temperature to decrease test-to-test variability caused by increased friction of a cold valve mechanism and variation of the impedance of the valve solenoid with temperature. If it is determined that the engine coolant temperature is below the threshold temperature then the method 300 proceeds to 304 as described above.

If the engine coolant temperature is above the threshold temperature, then the method 300 proceeds to 314 to indicate entry conditions for the method 200 are met.

Thus, method 300 checks one or more conditions to determine if conditions for the method 200 to be executed are met, the one or more conditions including a valve position sensor is not degraded, the battery SOC is greater than or equal to a threshold SOC, the previous engine cycle ran for greater than a threshold duration of time, an end-stop learning cycle for the EGR valve is completed, and that the engine coolant temperature is greater than a threshold temperature.

Turning now to FIG. 4, it shows a chart 400 illustrating methods executed prior to method 200. That is to say, prior to the EGR valve diagnostic being executed, the method 300 of FIG. 3 may be executed and a method 500 of FIG. 5 may also be executed. The methods 300 and 400 may be executed simultaneously or in series without departing from the scope of the present disclosure.

Turning now to FIG. 5, it shows a method 500 for determining a resting position of the EGR valve. In one example, the method 500 may include the end-stop learning described above with respect to FIG. 3. In one example, method 500 is a pre-conditioning method and/or step prior to the method 200 of FIG. 2. The EGR valve may not (when power is reduced to zero) fall back to its fully closed position. It may, for example, fall back to a position that is open by 10% of the travel distance between the fully closed and fully open positions, described above as the resting position. Method 500 may determine the resting position of the EGR valve for use in the method 200 in place of the position $POS_{closed}$.

The method 500 begins at 502, which includes opening the EGR valve. This may include setting a power supply to the valve actuator to a power supply corresponding to a predetermined position.

The method 500 proceeds to 504, which includes decreasing the power supply to zero. This may cause the EGR valve to fall back to a resting position, or rest position, $POS_{rest}$. $POS_{rest}$ may be distinct from EGR valve fully closed position. The resting position may be stored in a look-up table, which may be used in methods 200 and 300. This resting position may be detected by recording the position of the EGR valve (and defining it as its resting position) once valve movement has ceased. In this way, the resting position of the EGR valve may change over time as a force of the return spring weakens or as particulates accumulate onto the EGR valve, thereby changing the resting position of the EGR valve. In one example, as particulate accumulation increases, the resting position may move further away from the fully closed position of the EGR valve.

When the method 500 is executed prior to method 200, the valve resting position $POS_{rest}$ may be used in the method 200 in place of the closed position $POS_{closed}$, to represent the end of valve travel during the test, (e.g., at 216 when the power supplied is set to zero the EGR valve will fall back to its rest position $POS_{rest}$). When method 500 is performed prior to method 200 the resting position may be used at 218 where $t_{travel}$ is the time taken for the EGR valve to travel from the set position $POS_{hold}$ to its rest position $POS_{rest}$ (as opposed to its closed position $POS_{closed}$).

This, in turn may modify the calculation of $v_{travel}$ which is dependent on $L_{travel}$ now defined above in terms of $POS_{rest}$. Thus, method 500, performed before method 200, may allow the resting position of the valve to be used, rather than the fully closed position to which the valve may not be able to return.

The method 500 proceeds to 506, which may include determining the EGR valve resting position. To determine the EGR valve's arrival at the resting position, the valve velocity may be calculated by dividing the change in valve position by the time taken to change position, or dividing the valve position by the time elapsed between repeated execution steps. Then, when the valve velocity in the closing direction falls below a preset threshold (a low threshold, such as zero) it may be determined that the valve has arrived at its resting position. Alternatively, it may be determined that the valve has arrived at its resting position when a fixed time has elapsed following removal of the power (e.g. following removal of a drive current or valve's duty cycle). This fixed time may be sufficiently large and empirically based on a time that the valve will have reached a stationary position, for example the fixed time may be 2 seconds.

At any rate, the plausibility of the resulting resting position may be checked by comparing it to an expected range of positions for the valve in use (e.g. it may be expected that the resting position will be in the range of from 5% to 15% travel). Additionally or alternatively, the resting position may be compared to previous resting positions, wherein a current resting position may be accepted if it is within a threshold percentage (e.g., within 5%) of a previous resting position.

Turning now to FIG. 6A, it shows a graph illustrating an overview of the method 200 being performed to diagnose an EGR valve. More specifically, FIG. 6A shows steps 208-222 of the method 200 being performed three times (repeated twice) and FIG. 6B shows a graph showing the steps 208-222 performed once.

In both FIGS. 6A and 6B, the power supplied to the EGR valve actuator is shown in plot 600 and the EGR valve position is shown in plot 605.

The power to the EGR valve actuator is increased at 601, before and during which time the position of the EGR valve is held at its closed position (at 0 on the y-axis of plot 605). At some time during 601 the power reaches a level sufficient for the EGR valve to open. The position of the EGR valve then increases, at 607. At 602 the power is maintained to hold the valve position at a set position 608. At 603 the power is reduced to zero and the valve position drops, at 609, to its closed position 610 and/or resting position 610.

At 604 the hang time is represented, being the time the valve stays at the set position before falling back to its closed position in response to the removal of power.

At 615 the travel time is represented, being the time taken for the EGR valve to fall back to its closed position from its set position.

Turning now to FIG. 7, it shows the method 300 of FIG. 3 being performed at 700 prior to the method 200 of FIG. 2 which is performed three times at 750, hereafter referred to as a 'measurement phase'. At 700, method 300 is performed to learn the resting position of the valve, followed by repeated cycles of steps 208-222 of method 200 at 750 which provide data to determine the average breakaway power, the hang time, the travel time, and the valve travel speed (across the cycles).

At 701 the valve position is fully closed (which in this example is approximately 8.5% of the valve's travel distance). However, a negative duty cycle or a current driving the valve in the closing direction, for example, may have been applied to the valve before the start of method 300/ region 700 in order to hold the valve in that fully closed position.

Subsequently, zero power (i.e. no driving current, no duty cycle) is applied at the end of the pre-conditioning phase 700 but because of the "negative" power driving the valve in the fully closed position the valve position before and after the pre-conditioning phase 700 may be different (depending on the valve design) and it is the resting position at the end of the pre-conditioning phase 700 that should be used to mark the end of the "drop" step of the valve at each cycle of the measurement phase.

It will be readily seen from FIG. 7 that the resting position (approximately 13% of the valve's travel distance) at 702 is used in the measurement phase in place of the closed position (as was used in FIGS. 6A and 6B).

In this way, an EGR valve opening and closing may be characterized to determine if contamination of the EGR valve is sufficient to demand a cleaning. By executing the diagnostic, the EGR valve may be cleaned prior to operation of the EGR valve degrading so that engine operating parameters are impacted. The technical effect of executing the diagnostic of the EGR valve is to decrease service of the EGR valve, increase its longevity, and maintain desired engine operating parameters.

In another representation, a method comprises executing an EGR valve diagnostic following an engine deactivation to determine if an EGR valve cleaning is desired, wherein the EGR valve diagnostic calculates three or more of a breakaway value, a holding power value, a hang time value, a travel time value, and a travel speed value as an EGR valve is actuated from a resting position, to a predetermined position, and back to the resting position. A first example of the method further comprises where the breakaway value is equal to an amount of power used to actuate the EGR valve from the resting position to the predetermined position. A second example of the method, optionally including the first example, further comprises where the holding power value is equal to an amount of power used to hold the EGR valve in the predetermined position. A third example of the method, optionally including the first and/or second examples, further includes where the hang time value is calculated in response to power supplied to an actuator of the EGR valve being adjusted to zero when the EGR valve is in the predetermined position, the hang time being equal to a delay from when power supplied to the actuator of EGR valve is adjusted to zero to when the EGR valve begins to move from the predetermined position to the resting position. A fourth example of the method, optionally including one or more of the first through third examples, further includes where the travel time value is equal to a time used for the EGR valve to travel from the predetermined position to the resting position. A fifth example of the method, optionally including one or more of the first through fourth examples, further includes where the travel speed value is equal to a travel speed of the EGR valve travelling from the predetermined position to the resting position. A sixth example of the method, optionally including one or more of the first through fifth examples, further includes where the resting position is between a fully closed position and a fully open position, and where the resting position comprises where zero power is supplied to an actuator of the EGR valve. A seventh example of the method, optionally including one or more of the first through sixth examples, further includes where the EGR valve cleaning is desired in response to one or more of the breakaway value being greater than a threshold breakaway value, the holding power value being greater than a threshold holding power value, the hang time value being greater than a threshold hang time value, the travel time value being greater than a threshold travel time value, and the travel speed value being less than a threshold travel speed value, the method further comprising executing a valve cleaning operation during subsequent vehicle operation.

Another representation of a system comprises an engine comprising an exhaust-gas recirculation passage fluidly coupling an exhaust passage to an intake passage, wherein exhaust gas from the exhaust-gas recirculation passage to the intake passage is adjusted via an exhaust-gas recirculation valve and a controller with computer-readable instructions stored on non-transitory memory thereof that when executed enable the controller to execute an exhaust-gas recirculation valve diagnostic in response to an engine being deactivated, wherein the exhaust-gas recirculation valve diagnostic comprises setting a power supply to an actuator of the exhaust-gas recirculation valve to zero, increasing the power supply to the actuator of the exhaust-gas recirculation valve to actuate the exhaust-gas recirculation valve to a predetermined position, calculating a breakaway value equal to the power supply to actuate the exhaust-gas recirculation valve to the predetermined position, holding the exhaust-gas recirculation valve at the predetermined position, calculating a holding value equal to a holding power supply used to hold the exhaust-gas recirculation valve in the predetermined position, decreasing the holding power supply to zero, measuring a hang time value equal to a time elapsed between decreasing the holding power supply to zero and the exhaust-gas recirculation valve moving out of the predetermined position, calculating a travel time of the exhaust-gas recirculation valve from the predetermined position to a resting position and calculating a travel speed of the exhaust-gas recirculation valve from the predetermined position to the resting position. A first example of the system further comprises where the instructions further enable the controller to determine one or more of if an exhaust-gas valve position is known, if a battery state of charge is greater than or equal to a threshold state of charge, if an engine operation duration prior to the engine being deactivated was greater than a threshold amount of time, if an end-stop learning was completed, and if a coolant temperature is greater than a threshold temperature prior to the exhaust-gas recirculation valve diagnostic. A second example of the system, optionally including the first example, further comprises where the threshold state of charge is based on a state of charge able to actuate the exhaust-gas recirculation valve to the predetermined position from the resting position a plurality of times. A third example of the system, optionally including the first and/or second examples, further comprises where the end-stop learning comprises learning one or more of a resting position, a fully closed position, and a fully open position of the exhaust-gas recirculation valve, and where the resting position is equal to a position of the exhaust-gas recirculation valve where zero power is supplied to an actuator of the exhaust-gas recirculation valve. A fourth example of the system, optionally including one or more of the first through third examples, further includes where the resting position is learned via opening the exhaust-gas recirculation valve via supplying an amount of power to the actuator of the exhaust-gas recirculation valve, decreasing the amount of power to zero, and sensing a valve speed equaling zero, wherein the resting position corresponds to when the valve speed of the exhaust-gas recirculation valve is equal to zero. A fifth example of the system, optionally including one or more of the first through fourth examples, further includes where the instructions further enable the controller to signal a cleaning operation in response to one or more of the breakaway value being greater than a threshold value, the holding value being greater than a threshold holding value, the hang time value being greater than a threshold hang time value, the travel time value being greater than a threshold travel time value, and the travel speed value being less than a threshold travel speed value. A sixth example of the system, optionally including one or more of the first through fifth examples, further includes where the predetermined position is equal to a position between a fully closed position and a fully open position, and where the predetermined position is closer to the fully closed position than the fully open position.

An additional representation of a method comprises actuating an EGR valve from a resting position to a predetermined position, calculating a breakaway power used to actuate the EGR valve from the resting position to the predetermined position, holding the EGR valve in the predetermined position, calculating a holding power used to hold the EGR valve in the predetermined position; and actuating the EGR valve from the predetermined position to the resting position, calculating a hang time for the EGR valve to move out of the predetermined position, calculating a travel time and a travel speed of the EGR valve from the predetermined position to the resting position, and signaling a cleaning operation in response to one or more of the breakaway power being greater than a threshold breakaway power, the holding power being greater than a threshold holding power, the hang time being greater than a threshold hang time, the travel time being greater than a threshold travel time, and the travel speed being less than a threshold travel speed. A first example of the method further comprises prior to actuating the EGR valve from the resting position to the predetermined position, determining an engine is deactivated, determining a battery state of charge is greater than or equal to a threshold state of charge, determining a resting position of the EGR valve, and determining a coolant temperature is greater than a threshold temperature. A second example of the method, optionally comprising the first example, further comprises calculating averages for each of the breakaway power, the holding power, the hang time, the travel time, and the travel speed. A third example of the method, optionally comprising the first and/or second examples, further comprises where an average breakaway power is calculated via gathering a plurality of breakaway power values based on actuating the EGR valve from the resting position to the predetermined position at least twice, wherein an average holding power is calculated via gathering a plurality of holding power values based on holding the EGR valve in the predetermined position at least twice, wherein an average hang time is calculated via gathering a plurality of hang time values based on measuring a delay of the EGR valve moving out of the predetermined position at least twice, wherein an average travel time is calculated via gathering a plurality of travel times based on actuating the EGR valve form the predetermined position to the resting position at least twice, and where an average travel speed is calculated via gathering a plurality of travel speeds based on actuating the EGR valve form the predetermined position to the resting position at least twice. A fourth example of the method, optionally comprising one or more of the first through third examples, further comprises where defining a function for one or more of the average breakaway power, the average holding power, the average hang time, the average travel time, and the average travel speed, and where the cleaning operation is desired in response to a comparison of a maximum of the function to a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
executing an EGR valve diagnostic following an engine deactivation to determine if an EGR valve cleaning is desired, wherein the EGR valve diagnostic calculates three or more of a breakaway value, a holding power value, a hang time value, a travel time value, and a travel speed value as an EGR valve is actuated from a resting position, to a predetermined position, and back to the resting position.

2. The method of claim 1, wherein the breakaway value is equal to an amount of power used to actuate the EGR valve from the resting position to the predetermined position.

3. The method of claim 1, wherein the holding power value is equal to an amount of power used to hold the EGR valve in the predetermined position.

4. The method of claim 1, wherein the hang time value is calculated in response to power supplied to an actuator of the EGR valve being adjusted to zero when the EGR valve is in the predetermined position, the hang time being equal to a delay from when power supplied to the actuator of EGR valve is adjusted to zero to when the EGR valve begins to move from the predetermined position to the resting position.

5. The method of claim 1, wherein the travel time value is equal to a time used for the EGR valve to travel from the predetermined position to the resting position.

6. The method of claim 1, wherein the travel speed value is equal to a travel speed of the EGR valve travelling from the predetermined position to the resting position.

7. The method of claim 1, wherein the resting position is between a fully closed position and a fully open position, and where the resting position comprises where zero power is supplied to an actuator of the EGR valve.

8. The method of claim 1, wherein the EGR valve cleaning is desired in response to one or more of the breakaway value being greater than a threshold breakaway value, the holding power value being greater than a threshold holding power value, the hang time value being greater than a threshold hang time value, the travel time value being greater than a threshold travel time value, and the travel speed value being less than a threshold travel speed value, the method further comprising executing a valve cleaning operation during subsequent vehicle operation.

9. A system comprising:
an engine comprising an exhaust-gas recirculation passage fluidly coupling an exhaust passage to an intake passage, wherein exhaust gas from the exhaust-gas recirculation passage to the intake passage is adjusted via an exhaust-gas recirculation valve; and
a controller with computer-readable instructions stored on non-transitory memory thereof that when executed enable the controller to:
execute an exhaust-gas recirculation valve diagnostic in response to an engine being deactivated, wherein
the exhaust-gas recirculation valve diagnostic comprises
setting a power supply to an actuator of the exhaust-gas recirculation valve to zero;
increasing the power supply to the actuator of the exhaust-gas recirculation valve to actuate the exhaust-gas recirculation valve to a predetermined position;
calculating a breakaway value equal to the power supply to actuate the exhaust-gas recirculation valve to the predetermined position, and where the breakaway value is stored in memory;
holding the exhaust-gas recirculation valve at the predetermined position;
calculating a holding value equal to a holding power supply used to hold the exhaust-gas recirculation valve in the predetermined position;
decreasing the holding power supply to zero;
measuring a hang time value equal to a time elapsed between decreasing the holding power supply to zero and the exhaust-gas recirculation valve moving out of the predetermined position;
calculating a travel time of the exhaust-gas recirculation valve from the predetermined position to a resting position; and
calculating a travel speed of the exhaust-gas recirculation valve from the predetermined position to the resting position.

10. The system of claim 9, wherein the instructions further enable the controller to determine one or more of if an exhaust-gas valve position is known, if a battery state of charge is greater than or equal to a threshold state of charge, if an engine operation duration prior to the engine being deactivated was greater than a threshold amount of time, if an end-stop learning was completed, and if a coolant temperature is greater than a threshold temperature prior to the exhaust-gas recirculation valve diagnostic.

11. The system of claim 10, wherein the threshold state of charge is based on a state of charge able to actuate the exhaust-gas recirculation valve to the predetermined position from the resting position a plurality of times.

12. The system of claim 10, wherein the end-stop learning comprises learning one or more of a resting position, a fully closed position, and a fully open position of the exhaust-gas recirculation valve, and where the resting position is equal to a position of the exhaust-gas recirculation valve where zero power is supplied to an actuator of the exhaust-gas recirculation valve.

13. The system of claim 12, wherein the resting position is learned via opening the exhaust-gas recirculation valve via supplying an amount of power to the actuator of the exhaust-gas recirculation valve, decreasing the amount of power to zero, and sensing a valve speed equaling zero, wherein the resting position corresponds to when the valve speed of the exhaust-gas recirculation valve is equal to zero.

14. The system of claim 9, wherein the instructions further enable the controller to signal a cleaning operation in response to one or more of the breakaway value being greater than a threshold value, the holding value being greater than a threshold holding value, the hang time value being greater than a threshold hang time value, the travel time value being greater than a threshold travel time value, and the travel speed value being less than a threshold travel speed value.

15. The system of claim 9, wherein the predetermined position is equal to a position between a fully closed position and a fully open position, and where the predetermined position is closer to the fully closed position than the fully open position.

16. A method comprising:
actuating an EGR valve from a resting position to a predetermined position;
calculating a breakaway power used to actuate the EGR valve from the resting position to the predetermined position;
holding the EGR valve in the predetermined position;
calculating a holding power used to hold the EGR valve in the predetermined position; and
actuating the EGR valve from the predetermined position to the resting position;
calculating a hang time for the EGR valve to move out of the predetermined position;
calculating a travel time and a travel speed of the EGR valve from the predetermined position to the resting position; and
signaling a cleaning operation in response to one or more of the breakaway power being greater than a threshold breakaway power, the holding power being greater than a threshold holding power, the hang time being greater than a threshold hang time, the travel time being greater than a threshold travel time, and the travel speed being less than a threshold travel speed.

17. The method of claim 16, further comprising prior to actuating the EGR valve from the resting position to the predetermined position, determining an engine is deactivated, determining a battery state of charge is greater than or equal to a threshold state of charge, determining a resting position of the EGR valve, and determining a coolant temperature is greater than a threshold temperature.

18. The method of claim 16, further comprising calculating averages for each of the breakaway power, the holding power, the hang time, the travel time, and the travel speed.

19. The method of claim 18, wherein an average breakaway power is calculated via gathering a plurality of breakaway power values based on actuating the EGR valve from the resting position to the predetermined position at least twice, wherein an average holding power is calculated via gathering a plurality of holding power values based on holding the EGR valve in the predetermined position at least twice, wherein an average hang time is calculated via gathering a plurality of hang time values based on measuring a delay of the EGR valve moving out of the predetermined position at least twice, wherein an average travel time is calculated via gathering a plurality of travel times based on actuating the EGR valve form the predetermined position to the resting position at least twice, and where an average travel speed is calculated via gathering a plurality of travel speeds based on actuating the EGR valve form the predetermined position to the resting position at least twice.

20. The method of claim 19, further comprising defining a function for one or more of the average breakaway power, the average holding power, the average hang time, the average travel time, and the average travel speed, and where the cleaning operation is desired in response to a comparison of a maximum of the function to a threshold.

* * * * *